Feb. 12, 1957 F. J. KENNEDY 2,781,145
T AND CROSS BOXES FOR ELECTRIC HEADER DUCTS
Filed June 10, 1953
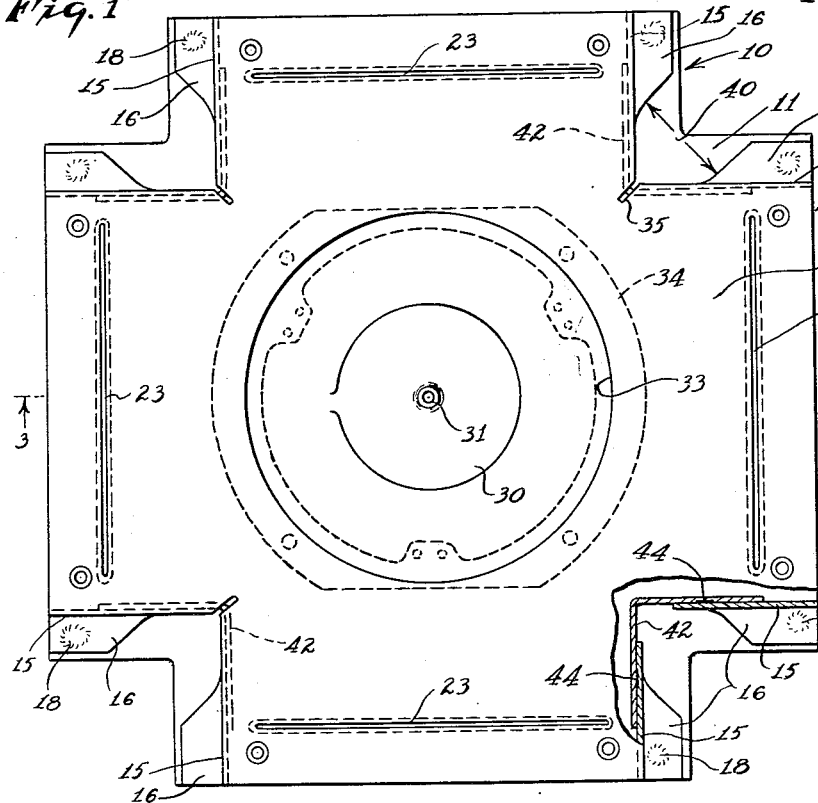
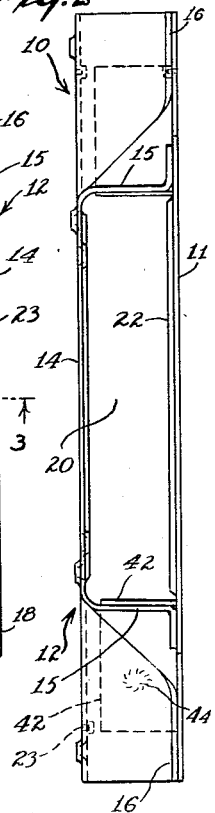
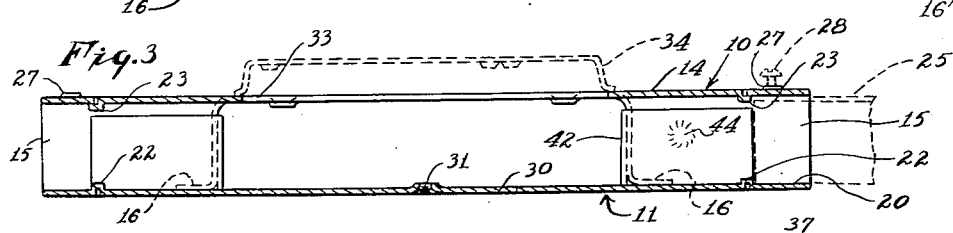
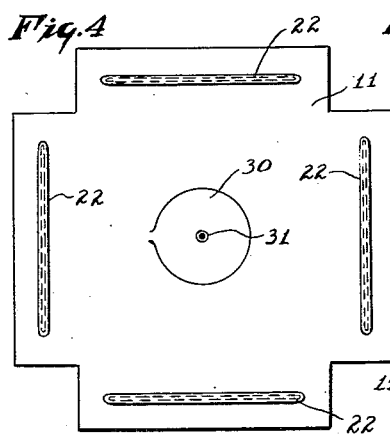
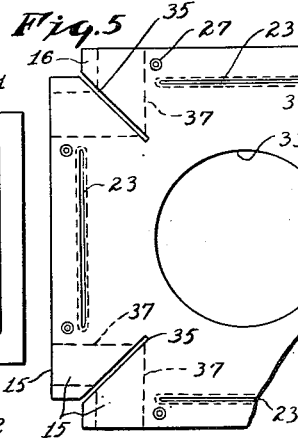
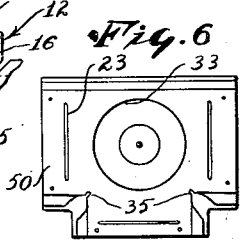
INVENTOR.
Frank J. Kennedy
BY Emery, Varney,
Whittemore & Dix
ATTORNEYS

United States Patent Office 2,781,145
Patented Feb. 12, 1957

2,781,145

T AND CROSS BOXES FOR ELECTRIC HEADER DUCTS

Frank J. Kennedy, Mount Lebanon, Pa., assignor to National Electric Products Corporation, Pittsburgh, Pa., a corporation of Delaware Application June 10, 1953, Serial No. 360,689

4 Claims. (Cl. 220—3.2)

This invention relates to electrical raceways and more especially to boxes for connecting sections of raceways that extend at an angle to one another. The invention is principally concerned with cross and T boxes for header ducts.

It is an object of the invention to provide improved cross and T boxes which are of simplified construction and more economical to manufacture. Another object is to provide cross and T boxes constructed entirely from simple metal stampings.

In its preferred construction, the box is made from two plate elements, one of which has panels bent downwardly to form the side walls of the box, and there are filler pieces at the corners of the box where the panels separate from one another when bent downwardly to form the side walls. Other features of the invention relate to the relation of the filler pieces with the walls of the box for quick and convenient assembly, and to the location of the filler pieces with respect to corrugations in the stampings that serve as stops for positioning the sections of header duct with respect to the box.

Other objects, features and advantages of the invention will appear or be pointed out as the description proceeds.

In the drawing, forming a part hereof, in which like reference characters indicate corresponding parts in all the views:

Figure 1 is a top plan view, with one corner broken away and in section, showing a cross box made in accordance with this invention;

Figure 2 is a side elevation of the box shown in Figure 1;

Figure 3 is a sectional view taken on the line 3—3 of Figure 1;

Figure 4 is a top plan view, on a reduced scale, of the bottom plate that is used to make the box;

Figure 5 is a top plan view on the same scale as Figure 4, partly broken away, showing the flat stamping from which the body portion of the box is made; and Figure 6 is a reduced scale view of a T box made in accordance with this invention.

Figure 1 shows a cross box 10 which includes a bottom plate 11 and a body portion 12. The body portion has a top wall 14 and side walls 15. These side walls extend downwardly to the bottom plate 11, and they have flanges 16 which are bent outwardly and generally parallel to the bottom plate 11. The flanges 16 are secured to the bottom plate 11 by spot welding 18.

The bottom plate 11, top wall 14 and side walls 15 at the right-hand side of the cross, form an opening 20 for receiving the end of a section of header duct. There is a corrugation 22 in the bottom plate 11. This corrugation extends upwardly into the opening 20 to provide an abutment or stop for limiting the extent to which the header duct can be inserted into the cross box. There is a corresponding corrugation 23 in the top wall 14 immediately above the corrugation 22, in position to serve as a stop for the end of a section of header duct.

Figure 3 shows, in dotted lines, an end portion of header duct 25, and illustrates the way in which the corrugations 22 and 23 provide stops against which the end faces of the header duct contact when the duct and cross box are in a predetermined assembled relation.

There are bosses 27 on the top wall 14 with openings therethrough and threads in the opening for receiving set screws 28 that clamp the duct against displacement.

Figure 4 shows the bottom plate 11 before it is assembled with the body portion of the box. This plate 11 has a knockout 30 at a center location; and has an opening 31 for use as a drill guide when cutting into a cellular floor beneath the duct, and for receiving a tool to pull the knockout 30 up into position to be severed from the box. There are corrugations 22 spaced inwardly from each of the edges of the plate 11 by predetermined and equal distances, and these corrugations are preferably parallel to the edges of the plate. The corners of the plate 11 are cut out by removing portions which are substantially square in the illustrated construction.

Figure 5 shows the body portion 12 in its generally flat condition before its panels have been bent downwardly to form the sides of the box. The body portion 12 has a center opening 33 for access to the interior of the box when fishing wires or doing other work on the electrical system. When installed in an electrical system, the opening 33 has a ring 34 surrounding it and extending upwardly for connection with a floor tap, cover, or some other element which may be used over the opening.

There are slits 35 extending inwardly along the diagonals of the body portion 12 for a limited distance. These slits 35 provide panels, indicated by the reference character 15, and these panels may be considered as joined to the rest of the body portion 12 along the dot and dash lines 37.

These panels, when bent downwardly, form the side walls 15 of the box. When the panels 15 are bent downwardly, the flanges 16 are bent outwardly into planes substantially parallel with the original plane of the plate from which the body portion 12 is made.

The cut out corners of the bottom plate 11 are of such size that the flanges 16 overlie the portion of the bottom plate 11 near the edges of the plate from which the square sections were cut away. When the panels or side walls 15 are bent downwardly, however, the slit 35 becomes progressively wider toward the bottom of the box. This space between the walls 15, of the angularly related outlets, is indicated by the dimension arrow 40 in Figure 1.

In order to prevent the box from having openings at the space indicated by the arrow 40, there is a filler piece 42 having two arms at the same angular relation to one another as the outlets of the box. In the illustrated construction, this angular relation is 90°. The filler piece 42 is long enough to extend behind both of the walls 15 for a substantial distance. The filler piece 42 rests on the bottom plate 11, and is high enough to reach almost to the other top wall 14. It is not necessary to have the filler piece 42 reach all the way to the top wall because the slit 35 becomes very narrow and does not need a filler piece near the top of the walls 15.

The fact that the filler piece 42 is of slightly less height than the distance between the bottom plate 11 and the top wall 14 makes the original locating of the filler pieces in the box an operation that can be performed quickly. The filler pieces are held in assembled relation by spot welding 44. They do not form a waterproof construction but this is not objectionable because the boxes are covered with a paste, such as roofing asphalt, before the concrete floor is poured over the electric raceways.

Figure 6 shows a T box 50. This box is constructed in the same way as the cross shown in Figure 1, except for the modified shape which results from the provision of three outlets instead of four. The bottom plate for the T box shown in Figure 6 is the same as the plate 11 shown in Figure 4 except that this plate is cut along a single straight line which is in alignment with the bottom lines of the square cutouts at the top of the plate 11. The body portion of the T box 50 differs from that shown in Figure 5 in that the two upper slits 35 are omitted and the plate is cut along a single straight line corresponding to the bottom lines of the corners cut out in Figure 5. There is, of course, no corrugation on the side of the box which has no outlet.

The preferred embodiment of the invention has been illustrated and described. Terms of orientation are, of course, relative; and changes and modifications can be made without departing from the invention as defined in the claims.

What is claimed is:

1. An electrical raceway box having a plurality of outlet passages, some of which are at an angle to others, the box comprising a top having pairs of downwardly extending panels, the panels of each pair being separated from one another by a gap and extending downwardly along planes that are at an angle to one another so as to form inwardly extending corners for the box and sides for angularly related outlet passages of the box, a bottom plate for the box, flanges at the lower edges of the panels, extending outwardly parallel to the bottom plate, the flanges being substantially parallel to and rigidly connected with the bottom plate, and filler pieces bridging the gaps between the panels of respective pairs of panels, each filler piece having two portions extending in the same angular relation to one another as adjacent panels at corners of the box, and each filler piece having portions extending beyond both sides of the gap and overlapping the panels and securely held in assembled relation to other parts of the box.

2. An electrical raceway box including a body portion formed from a flat plate which has a center portion that serves as the top of the box, and that has panels at each corner of the plate separated from one another by diagonal slits, the panels being bent downwardly along lines at substantially right angles to one another and that comprise side limits of the top of the box, a bottom plate to which the lower portions of the panels are rigidly connected, the bottom plate forming, with the top and downwardly extending panels, openings for receiving the ends of raceway sections, corrugations in the top and in the bottom plate projecting into the openings for the raceway sections at some distance inward from the ends of the openings to provide abutments for limiting the extent to which the raceways can be inserted into the openings, and filler pieces resting on the bottom plate and bridging the space between the panels which were originally separated by a slit, the filler piece having portions that are in angular relation to one another and each of which extends along a part of one of the panels.

3. An electrical raceway box including a bottom plate with upwardly extending corrugations in position to form abutments for limiting the extent to which the raceway sections can be inserted into the box, the body portion of the box comprising a metal stamping formed from a flat plate that was originally of generally rectangular shape with cut-out corners and slots extending along diagonals of the plate to leave panels, said panels being bent downwardly into contact with the bottom plate and having outwardly bent flanges along the lower edges of the panels rigidly connected to the bottom of the plate, a filler piece that bridges the space between the downwardly turned panels on opposite sides of the slit, each of the filler pieces having a lower edge resting on the bottom plate and having angularly related portions that combine to bridge the space between the flanges on opposite sides of each slit, each of the filler pieces being substantially as high as the space between the top and bottom of the box, and each of the filler pieces having a length sufficient to overlie portions of the panels at opposite ends of the filler pieces, and means rigidly securing the filler pieces to other parts of the box.

4. An electrical raceway box including a body portion formed from a flat plate which has a center portion that serves as the top of the box, and that has panels at each corner of the plate separated from one another by diagonal slits, the panels on opposite sides of each slit being of one piece construction with the top of the box and bent downwardly along lines at substantially right angles to one another and that comprise side limits of the top of the box, a flange at the lower end of each of the downwardly extending panels, each flange extending in a plane generally parallel to the plane of the top of the box, a bottom plate generally parallel to the flanges and to which the flanges of the panels are rigidly connected, the bottom plate forming, with the top and downwardly extending panels, openings for receiving the ends of raceway sections, abutments for limiting the extent to which the raceways can be inserted into the openings, the downwardly bent panels on each side of the diagonal slits forming inwardly extending corners of the box and the bottom plate being notched and forming corresponding inwardly extending corners for the bottom of the box.

References Cited in the file of this patent

UNITED STATES PATENTS

| 1,235,115 | Coppage | July 31, 1917 |
| 2,628,873 | Bennett | Feb. 17, 1953 |

FOREIGN PATENTS

| 345,568 | Great Britain | Mar. 26, 1931 |
| 667,023 | Great Britain | Feb. 20, 1952 |